(12) United States Patent
Aboukhadijeh et al.

(10) Patent No.: US 12,346,443 B2
(45) Date of Patent: Jul. 1, 2025

(54) IDENTIFYING AMBIGUOUS PATTERNS AS MALWARE USING GENERATIVE MACHINE LEARNING

(71) Applicant: Socket, Inc., Stanford, CA (US)

(72) Inventors: Feross Hassan Aboukhadijeh, El Dorado Hills, CA (US); Mikola Christopher Lysenko, Midland, MI (US)

(73) Assignee: Socket, Inc., Stanford, CA (US)

( * ) Notice: Subject to any disclaimer, the term of this patent is extended or adjusted under 35 U.S.C. 154(b) by 230 days.

(21) Appl. No.: 18/118,703

(22) Filed: Mar. 7, 2023

(65) Prior Publication Data

US 2024/0303334 A1    Sep. 12, 2024

(51) Int. Cl.
*G06F 21/56* (2013.01)
*G06F 21/57* (2013.01)
*G06N 20/00* (2019.01)

(52) U.S. Cl.
CPC .......... *G06F 21/566* (2013.01); *G06F 21/577* (2013.01); *G06N 20/00* (2019.01); *G06F 2221/034* (2013.01)

(58) Field of Classification Search
CPC ............ G06F 21/566; G06F 21/577; G06F 2221/034; G06F 21/562; G06N 20/00; G06N 3/045; G06N 5/01; G06N 5/022; G06N 7/01
See application file for complete search history.

(56) References Cited

U.S. PATENT DOCUMENTS

| | | | |
|---|---|---|---|
| 10,868,823 B2 * | 12/2020 | Pilkington | H04L 63/14 |
| 11,893,120 B1 | 2/2024 | Jennings | |
| 12,235,962 B2 * | 2/2025 | Cohen | G06F 21/52 |
| 2022/0035927 A1 * | 2/2022 | Lysecky | G06F 21/566 |
| 2024/0303333 A1 * | 9/2024 | Aboukhadijeh | G06F 21/566 |
| 2025/0028818 A1 * | 1/2025 | Kim | G06F 21/552 |

FOREIGN PATENT DOCUMENTS

| | | |
|---|---|---|
| CA | 2868054 C | 6/2018 |
| CN | 116628685 A | 8/2023 |

\* cited by examiner

*Primary Examiner* — Michael Won
(74) *Attorney, Agent, or Firm* — Fenwick & West LLP

(57) ABSTRACT

A request is received to scan a package integration for a malicious dependency, the package integration to be integrated into an application. Using a known package cache, a subset dependencies of the package integration that have not been previously scanned is determined. Content of each file of the subset is input into a malware detection model, and an identification of an ambiguous pattern is received from the malware detection model. Responsive to receiving the identification of the ambiguous pattern, the ambiguous pattern is input into a severity model, and a level of severity that the ambiguous pattern would impose on an assumption that malware is present is received. Where the level of severity is above a threshold minimum level of severity, a query is transmitted to a generative machine learning model to determine whether malware is present.

20 Claims, 5 Drawing Sheets

402 — receive a request to scan a package integration for a malicious dependency, the package integration comprising a plurality of dependencies, the package integration to be integrated into an application 404 — determine a subset of the plurality of dependencies that, if executed, would be used by the application 406 — determining, by accessing a known package cache, that at least a portion of a file of the subset was not previously scanned 408 — responsive to determining that a portion of the file of the subset was not previously scanned: access a graph representation of the portion, the graph representation comprising a tree with edges that connect a representation of the portion with representations of one or more further dependent files that depend from the portion, scan the portion and each of the one or more further dependent files for malware, and update the known package cache with the tree and with results of the scan 410 — determine whether malware is within the package integration using the known package cache and the results of the scan 412 — responsive to determining that malware is within the package integration, outputting an alert

FIG. 4

IDENTIFYING AMBIGUOUS PATTERNS AS MALWARE USING GENERATIVE MACHINE LEARNING

BACKGROUND

Existing tools for identifying malware in open-source software require a user to download and install every package that is part of the software onto a machine within their control. These tools are not scalable and are inefficient, as they require huge amounts of storage space on user hard drives and huge amounts of bandwidth for the download. Moreover, these tools are ineffective, as they are unable to detect malware that covers its own tracks during the installation process, thus leaving the user's machine vulnerable to malicious behavior of the malware while failing to confer their purported ability of identifying malware.

Additionally, while the use of generative machine learning has proliferated, with large language models being used to process queries across a variety of domains, such use of generative machine learning at scale is inefficient and not scalable given the large amount of time and compute resources required to process a sophisticated query.

SUMMARY

Systems and methods are disclosed herein for determining malware in package integrations (e.g., open source software) that a user intends to integrate into an application without requiring installation on a machine of the user. In an embodiment, a known package cache may store a graph (e.g., a directed acyclic graph (DAG)) having nodes that represent package integrations and edges that connect files of those package integrations to their dependencies and known malware associated with those dependencies. When a user requests a malware analysis of a package integration, a malware detection tool may access the package integration and generate a graph that is representative of the package integration and its dependencies (e.g., for files that would be used by the application). The files of the graph may be efficiently compared (e.g., using hashing techniques) to a corresponding segment of the known package cache, and known malware corresponding to those dependencies (if any) may be surfaced to the user. Additionally, where the files of the package integration do not match those of the known package cache, those files (or portions thereof) are analyzed for malware. Newly discovered malware may be surfaced to the user, and the known package cache may be updated to reflect the now-known files that do not match so that those files and whether they contain malware are known in a subsequent search. Through these processes, should dependencies change in a package integration, those dependencies may be quickly discovered and surfaced to users known to use those package integrations.

In some cases, it may be difficult to ascertain whether a file in a package integration dependency actually includes malware. Pattern recognition may be used to determine whether malware is present; however, a confidence level may be strong enough to raise a suspicion of malware, but may be too weak to rely upon to draw a conclusion that malware actually is present. In such scenarios, generative machine learning may be used as a tool to determine whether malware is present by inputting a query as to whether the pattern is indicative of malware; however, querying generative machine learning models is computationally expensive and it takes a large amount of time to receive responses to such queries, thus resulting in scalability constraints. To address these issues, in an embodiment, a malware detection tool may determine a level of severity of possible malware. Where the consequence of suspected malware is severe (e.g., the malware is catastrophically dangerous to the application or users thereof if it is present), the malware detection tool may query a generative machine learning model, while refraining from doing so where consequences are tolerable, thus improving scalability and improving computational efficiency and time constraints. Moreover, results from such queries may be stored in a database (e.g., in the known package cache in association with the package integration in which the suspected malware was found), and such results may be referenced in the future to avoid querying the generative machine learning model more than once with respect to a given suspected malware pattern.

BRIEF DESCRIPTION OF THE DRAWINGS

FIG. 3 shows one embodiment of an exemplary user interface for requesting a malware detection scan for a package integration, in accordance with an embodiment.

FIG. 4 illustrates an exemplary process for operating the malware detection tool, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
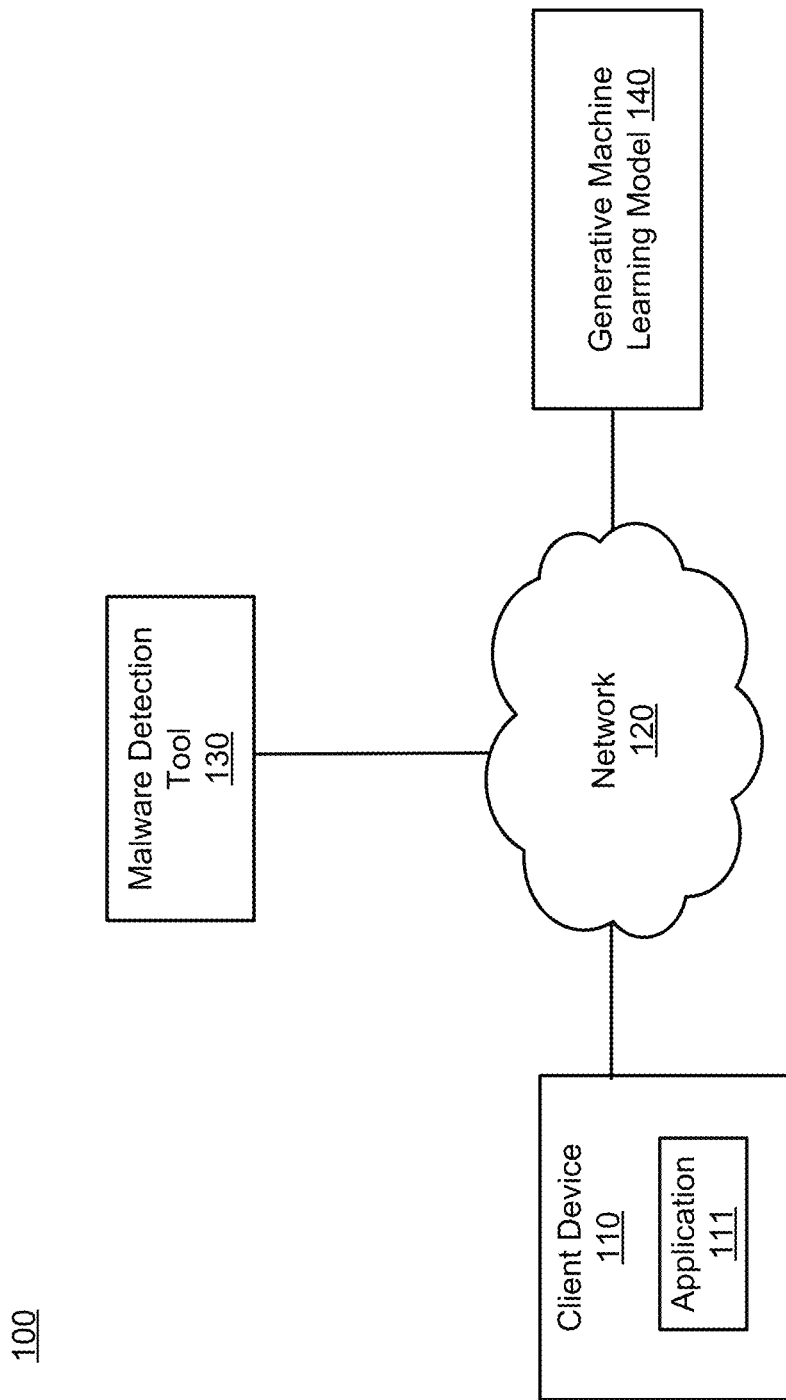
FIG. 1 illustrates one embodiment of a system environment for implementing a malware detection tool, in accordance with an embodiment.

FIG. 1 illustrates one embodiment of a system environment for implementing a malware detection tool, in accordance with an embodiment. As depicted in FIG. 1, environment 100 includes client device 110 (with application 111 installed thereon), network 120, malware detection tool 130, and generative machine learning model 140. While only one instance of each item is depicted, this is for illustrative convenience, and references in the singular to each item is meant to cover instances where plural items exist.

The term malware, as used herein, typically refers to malicious software (e.g., software that performs a function other than what is intended by the application developer). Examples of malicious software include software that, though not requested by an application developer, deletes information, locks access to information, causes unwanted communications, and so on. Wherever malware and/or software examples are referred to herein, non-software embodiments of malware equally apply. That is, malware need not be unwanted software, and instead could be an unknown aspect of a package integration that unintentionally binds a user to a constraint (e.g., a copyleft provision that binds the user to freely license the entire application with which the package integration is used).

The term package integration, as used herein, may refer to any pre-existing functionality that is available for integration with an application. Most commonly, a package integration refers to open-source software. However, the package integration need not be open-source, and may be any other component that adds (or purports to add) functionality to an application. Typically, a package integration includes dependencies, which in turn may depend on further dependencies. For example, a package integration that incorporates a calendar functionality into an application may further depend on a time-and-date integration, a geolocation determination integration (e.g., to determine time zone that affects the calendar functionality), and so on. The dependencies themselves may be separate package integrations that are chained. Each package integration may be editable, where users of the package integration may be affected by edits dynamically as they occur, or where users may be prompted to update their integrations to a latest version.

Client device 110 is a device with which a user (e.g., an application developer) may request that malware detection be performed for a package integration. Client device 110 may be any device having a user interface and capable of communication with malware detection tool 130. For example, client device 110 may be a personal computer, laptop, tablet, wearable device, kiosk, smart phone, or any other device having components capable of performing the functionality disclosed herein.

Optionally, client device 110 may have application 111 installed thereon. Application 111 may provide an interface between client device 110 and malware detection tool 130. Application 111 may receive explicit requests from a user of client device 110 to have malware detection tool 130 scan a package integration before integrating the package integration into an application. Application 111 may monitor for attempts to integrate a package integration into an application, and may, upon detecting such an attempt, infer a request for a scan by malware detection tool. Application 111 may be a stand-alone application installed on client device 110, or may be accessed by way of a secondary application, such as a browser application. Any activity described herein with respect to malware detection tool 130 may be performed wholly or in part (e.g., by distributed processing) by application 111. That is, while activity is primarily described as performed in the cloud by malware detection tool 130, this is merely for convenience, and all of the same activity may be performed wholly or partially locally to client device 130 by application 111.

Network 120 facilitates transmission of data between client device 110, malware detection tool 130, and generative machine learning model 140, as well as any other entity with which any entity of environment 100 communicates. Network 120 may be any data conduit, including the Internet, short-range communications, a local area network, wireless communication, cell tower-based communications, or any other communications.

Malware detection tool 130 may determine and cache malware associated with package integrations, and may leverage the cache in performing malware determinations or may determine whether malware is in a package integration from scratch. Generative machine learning model 140 may be used by malware detection tool 130 to detect malware. While depicted apart from malware detection tool 130 as a third-party service, generative machine learning model 140 may be integrated with malware detection tool 130 as a first-party service. Malware detection tool 130 may have its functionality distributed across any number of servers, and may have some or all functionality performed local to client devices using application 111. Further details about malware detection tool 130 and generative machine learning model 140 are disclosed below with respect to FIGS. 2-6.

Building a Known Package Cache

Figure 2:
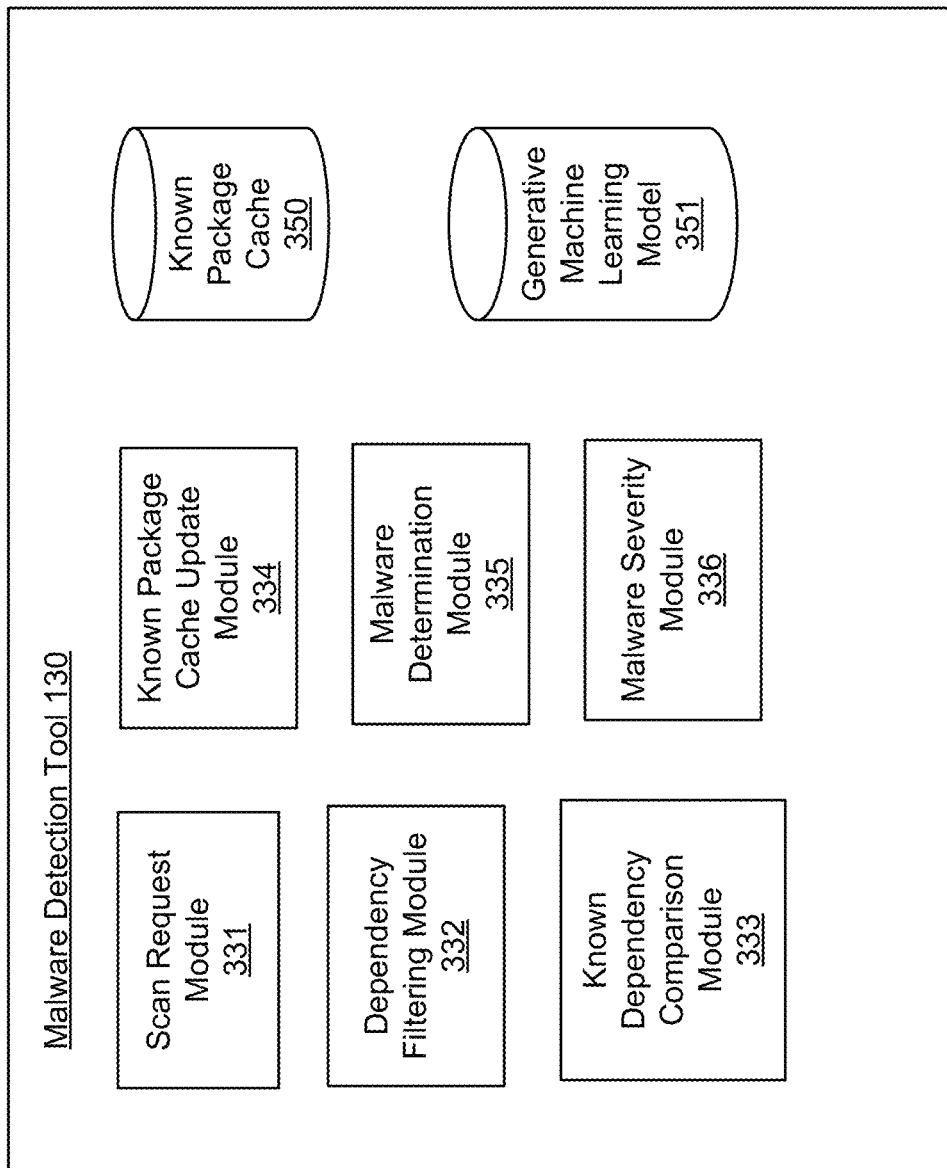
FIG. 2 illustrates one embodiment of exemplary modules and databases used by the malware detection tool, in accordance with an embodiment.

Before moving on to a discussion of FIG. 2, which goes into the particulars of how malware detection tool 130 processes a request for detecting whether malware is present in a package integration, some context is provided on how a known package cache (e.g., known package cache 350) is built. The known package cache organized using a directed graph, such as a DAG or Merkle DAG (MDAG). The directed graph includes root nodes for each known package integration, and tree structures from each root node having directed edges pointing down from dependency to dependency, each dependency having a corresponding node. Nodes may have multiple dependencies (e.g., file 1 depends on file 2 and file 3, and thus file 1 has two dependencies).

One utility of the directed graph is for the purpose of comparing files of a requested package integration with files known to be associated with that package integration to determine whether anything has changed. That is, responsive to receiving a request to determine whether a package integration includes malware, malware detection tool determines not just whether the known package cache knows of the package integration and knows that the package integration is not associated with malware, but also determines whether there is a delta between the known version of the package integration and the one associated with the request, as the delta (e.g., from a version update or a hidden change) may include malware. To this end, in an embodiment, each file is stored with reference to its corresponding node for the purpose of comparing the files with files of a newly requested package integration. However, storing entire files for myriad known package integrations could take huge amounts of storage space, and performing comparisons on an entire file-by-file basis is computationally very expensive.

In an embodiment, files are broken into chunks according to a repeatable algorithm. For example, the files may be sliced into chunks using a rolling hash function that scans across a file, and where the function falls below a threshold value, the file is cut into a chunk and the next scanned portion of the file begins the next chunk. Each chunk may be hashed, the result forming a hash key. The hash key for each chunk may be stored in association with the node on the graph corresponding to the file. This yields an ability for malware detection tool 130 to perform a much more efficient comparison for a requested package integration, where malware detection tool 130 may hash the files of the requested package integration according to the same algorithm, and may determine where the hash keys of the requested package integration for given chunks match those of their counterparts on the directed graph that no change has occurred. Where no change has occurred, malware detection tool 130 need not perform a malware analysis on a chunk, and may instead lean on a prior malware analysis that introduced the chunk into the graph. Where a change has occurred or where there is no counterpart chunk to a given new package integration file chunk (e.g., because a new dependency is added that did not exist before), malware detection tool 130 may perform a malware analysis on the change for a partial file or for the new file. Details of how malware analysis is performed is discussed in further detail below with respect to FIGS. 2-6.

Another use of the directed graph is for malware detection tool 130 to quickly determine whether there is, or is not, malware in known package integrations. That is, each node of the directed graph may be stored not only in association with a hash key for a corresponding file, but also in association with a malware classification (e.g., a binary classification of there is or is not malware, or a multi-dimensional classification that indicates with granularity what kind(s) of malware exists if malware does exist for a given file or chunk). Malware detection tool 130 may therefore determine that malware is associated with a known package integration simply by outputting known malware for a dependency that is known to have malware.

Malware detection tool 130 may reactively build the directed graph as new requests come in. That is, whenever malware detection tool 130 acts on a request to scan a package integration and finds updated or new files or portions thereof, malware detection tool 130 may add/update nodes and/or associations within the graph to reflect those updates and/or dependencies. Thus, over time through continued use by client devices 110, the known package cache becomes more and more robust. By only adding to the graph when changes are found to portions of files, deduplication is achieved where no representation of data is stored twice in the known package cache 350, thus saving on substantial storage space and yielding optimal scalability.

Malware Detection Tool Particulars

FIG. 2 illustrates one embodiment of exemplary modules and databases used by the malware detection tool, in accordance with an embodiment. As depicted in FIG. 2, malware detection tool 130 includes scan request module 331, dependency filtering module 332, known dependency comparison module 333, known package cache update module 334, malware determination module 335, and malware severity module 336, as well as various databases including known package cache 350 and generative machine learning model 351. The modules and databases depicted in FIG. 2 are merely exemplary, and more or fewer modules and/or databases may be used to achieve the functionality disclosed herein. It is also reiterated that any and all functionality disclosed with respect to malware detection tool 130 may be performed local to client device 110 by application 111.

Scan request module 331 receives a request to scan a package integration for a malicious dependency. As mentioned above with respect to FIG. 1, the request may be received explicitly or implicitly from activity performed on client device 110 using application 111. Responsive to receiving a request, malware detection tool 130 begins a process of scanning the package integration for malware.

Dependency filtering module 332 determines a subset of the plurality of dependencies that, if executed, would be used by the application. Many dependencies of a package integration would never actually be used by an application with which the package integration is integrated. For example, an open-source package may include links to test files, and the test files would never be used by an application that depends on the open-source package. It is not uncommon for a package integration to have hundreds of dependencies, but only 1% or 10% of those dependencies are used by an application that integrates with the package integration.

Dependency filtering module 332 builds a tree (e.g., a directed graph) showing all dependencies of the package integration. Dependency filtering module 332 may determine the dependencies by crawling files of the package integration for embedded dependencies (e.g., a link, pointer, embedded file, and so on), and then crawling those embedded dependencies for further embedded dependencies, and so on, until the tree fully represents all dependencies of the package integration. In an embodiment, the entire tree is used for comparison; however, this is inefficient and not useful when large portions of the tree may not be used by the application following integration. Therefore, in an embodiment, dependency filtering module 332 determines which dependencies will actually run. Dependency filtering module 332 may perform this determination by accessing code of the application that triggers the package integration (e.g., parameters of the code feed into some functions of the package integration, and those parameters are accessed). Dependency filtering module 332 walks the code within the files of the package integration and its dependencies and identifies each dependency that is part of the trigger, and keeps the nodes for those dependencies within the tree. Dependency filtering module 332 prunes all other nodes from the tree, thus resulting in the subset.

Known dependency comparison module 333 determines, by accessing known package cache 350, that at least a portion of a file of the subset was not previously scanned. This may be performed in any manner described in the foregoing, such as by generating hash keys for chunks of each file of the package integration, and comparing those hash keys to those of a corresponding known package reflected in a directed graph of known package cache 350. The file(s) or portions thereof that do not match may be now included for any reason, some malicious and others not, such as a version update of the package integration (likely not malicious), an unannounced dependency change within the portion of the file (more likely to be malicious), the entire package integration is new and unknown to known package cache 350, and so on.

In an embodiment, determining that at least a portion of a file of the subset was not previously scanned is performed by inputting a graph representation of the plurality of dependencies into a function, and receiving, as output from the function, respective file structures for each of the plurality of dependencies (that is, the hash keys). Determining, by known dependency comparison module 333, that the portion of the file that was not previously scanned based on its respective file structure not matching a known file structure stored in the known package cache 350.

Responsive to determining that a portion of the file of the subset was not previously scanned, known package cache update module 334 may access a graph representation of the portion (that is, the portion of pruned tree representing the subset that corresponds to the portion of the file). Note that the term portion of the file could refer to part or all of the file. Known package cache update module 334 may trigger a scan of the portion and each of the one or more further dependent files as indicated by the graph representation for malware (to be described with respect to malware determination module 335). Known package cache update module 334 may then update the known package cache with the tree and with results of the scan. This may be done by adding new nodes to an existing tree for a product integration (e.g., by adding new nodes for a portion added or changed during a version update), the new nodes including the chunks and whether or not those chunks are associated with malware. Thus, the next time the same package integration is encountered by any user of malware detection tool 130, there will be no need to scan again for malware unless something has changed.

In an embodiment, responsive to determining that malware is within the package integration, malware determination module 335 may output an alert. The alert may be output to the user with a warning as to that malware exists within the product integration, and may indicate more information such as a type of malware. Malware determination module 335 may log that the user was warned, such that when the user seeks to use the same package integration, the user is not warned again. Malware determination module 335 may determine that dependencies have changed that caused malware to exist in an existing version of a previously malware-free package integration used by other users of malware detection tool 130. Malware determination module 335 may proactively alert the other users of the newly added malicious dependency to enable the other users to take precautionary measures.

In an embodiment, malware determination module 335 determines whether malware is within the package integration using the known package cache and the results of the scan. The use of the known package cache is outputting previously known malware with respect to a previously known file of the package integration. For previously unknown portions of files within the package integration, malware determination may determine one or more patterns within the results of the scan. The patterns may be determined using any semantic pattern identification function, such as patterns of words, functions, file names, and so on being within a same file, or being within dependent files. Exemplary patterns may include a file that reads files from a disk and sends those files to a website, or files that execute code at install time that sends data to a network.

Malware determination module 335 may determine whether the patterns match one or more known malware patterns. This may be done heuristically and/or by using supervised learning. For heuristics, malware determination module 335 may consult a rules table that indicates patterns that are associated with malware, where malware determination module 335 may identify whether those patterns appear in one or more files. For supervised learning, malware determination module 335 may input entire files, portions of files, and/or identified patterns within the files into a supervised machine learning classifier. Malware determination module 335 may receive one or more classifications indicative of the one or more known malware patterns from the supervised machine learning classifier. The classifications may indicate a binary classification (malware or no malware) and/or may indicate granularly a malware type. The supervised machine learning classifier may be trained using ground truth data of patterns as labeled by whether or not those patterns are indicative of malware and/or a type of malware. Whether heuristics are used or supervised learning is used or a combination thereof, whatever is used may be referred to herein as a "malware detection model."

Malware determination module 335 may leverage generative machine learning model 351 to determine whether there is malware within a file. This is described in further detail in the next section below, and the principles from the next section apply equally here.

Malware Determination in Package Integration Using Generative AI

As mentioned above, generative artificial intelligence (AI) (sometimes referred to herein interchangeably as generative machine learning) is costly to use both in in terms of computational power required to run a query, and in terms of time required to run a query. Thus, while in some embodiments malware determination module 335 may use generative AI to identify whether there is malware relying on generative AI, this is minimized to ensure that generative AI is used in a targeted manner where a determination cannot otherwise be made using pattern matching.

Malware determination module 335 may determine, when identifying whether there is malware in a file or a portion thereof, that a pattern within the file is ambiguous as to whether it contains malware. The term ambiguous pattern, as used herein, may refer to a pattern that has at least a first threshold probability indicating malware may be present, but less than a second threshold probability corresponding to a conclusion that malware is in fact present. The first and second threshold probabilities may be set by an administrator. The probabilities may be output by a supervised machine learning model, such as the aforementioned classifier. The probabilities may be direct outputs (e.g., the model outputs X % likelihood that the file is not malicious, Y % likelihood that the file has a first type of malware, and Z % likelihood that the file has a second type of malware), where X, Y, and Z may be determined to be above or below each of the first and second threshold probabilities. The probabilities may also be confidence scores output with conclusions made by the classifier (e.g., a conclusion of malware of the first type is output, but with a confidence score of 82%; where the first threshold is 75% and the second threshold is 85%, the conclusion is ambiguous and therefore the associated pattern is an "ambiguous pattern").

Malware determination module 335 may, responsive to receiving the identification of the ambiguous pattern, input the ambiguous pattern into a severity model. The term severity model, as used herein, may refer to a model that classifies malware types into levels of severity. That is, the question being asked is, if the file in fact includes malware, would the consequences be sufficiently catastrophic that it is worth using generative AI despite the costs of doing so? A low severity malware file might write data to disk that is needless but otherwise harmless; a high severity malware file might transmit existing data that is sensitive to an external server, thus jeopardizing data privacy and integrity. The severity model, in an embodiment, may be a supervised machine learning model that is trained using historical patterns as mapped to a level of severity. That is, training examples may be used that include patterns as labeled by a severity level (e.g., a level from 1 to 100).

Malware determination module 335 may receive a level of severity that the ambiguous pattern would impose on an assumption that malware is present. Responsive to determining that the level of severity is above a threshold minimum level of severity (e.g., set by an administrator, such as a level of 85 being the threshold), malware determination module 335 may transmit a query to a generative machine learning model to determine whether malware is present in the ambiguous pattern, and may determine whether malware is present based on a response from the generative machine learning model. Upon making this determination, known package cache update module 335 may update known package cache 350 in any manner consistent with that disclosed in the foregoing to reflect the malware determination.

In an embodiment, malware determination module 335 may run a severity determination before running an ambiguous pattern determination. Responsive to the severity level being determined to be higher than a second higher threshold severity level (e.g., a severity threshold of 95), malware determination module 335 may determine to use generative machine learning model 351 (which runs the generative machine learning model) without reference to whether the pattern is ambiguous. This is advantageous in that where the stakes are high enough, malware determination module 335 errs on the side of being as accurate as possible in the malware determination rather than only triggering using the generative machine learning model 351 where threshold ambiguity is present.

Given that use of the generative machine learning model 351 is expensive, prior to using generative machine learning model 351 (e.g., and in embodiments prior to even running the severity determination module but after determining that the pattern is ambiguous), malware determination module 335 may first consult known package cache 350 to determine whether the generative machine learning model 351 had previously made a determination as to whether the file is malicious. For example, in some scenarios, prior determinations by the generative machine learning model may not be readily findable using the directed graph for the known package in question, as the determination may have been done on the same pattern but for a different known package that is not currently being traversed by malware detection tool 130.

To this end, malware determination module 335 may maintain a separate database of known ambiguous patterns (e.g., using known package cache 350). Malware determination module 335 may, responsive to determining that a pattern is ambiguous, query the database. Where generative AI was previously used for that pattern, an entry would appear along with a determination as to whether the pattern is associated with malware (e.g., and possibly more granularly a type of malware). Where the database returns a match, the prior decision is used, rather than again querying the generative AI. Moreover, whenever generative AI is used, the results of the query are used by malware detection module 335 to update the database to with an entry for the ambiguous pattern and the result of the generative AI.

Exemplary Use Case

Figure 3:
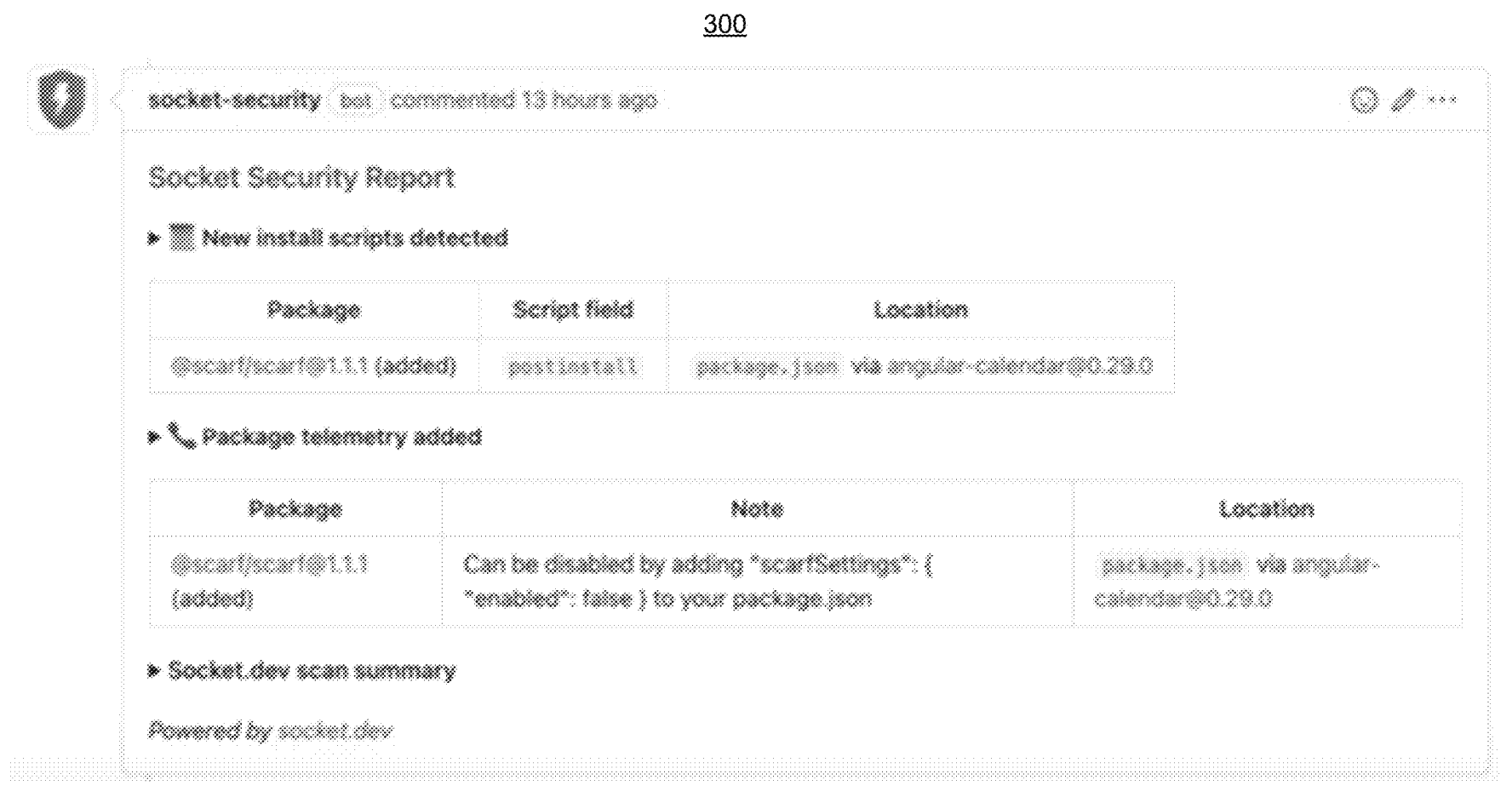

FIG. 3 shows one embodiment of an exemplary user interface for requesting a malware detection scan for a package integration, in accordance with an embodiment. Using user interface 300, client device 110 may request a malware scan for a package integration of a calendar widget called angular-calendar into an application. The request may be explicit, or may be implicit based on application 111 detecting that a user of client device 110 took steps to integrate angular-calendar. Malware detection tool 130 may scan the used dependencies of angular-calendar, and may determine that a package within the package integration called scarf is a dependency within angular-calendar that may contain malware. Thus, the alert may note that scarf includes malware. The alert may note additional information, such as information indicating that in the latest version of angular-calendar, relative to a prior version, scarf was added.

In an embodiment, malware detection tool 130 may provide a remediation recommendation. Malware detection tool 130 may determine, following a malware recommendation to a user, that the user took a step (e.g., adding "scarfSettings":{"enabled": false} to their package JSON, as shown in FIG. 4), and that the step successfully prevented the malware upon install. This determination may be performed by application 111 monitoring steps taken after a malware alert is provided, or may be performed passively, where a user seeing the malware alert populates a note about remediation for use by other users. Malware detection tool 130 may add such remediation recommendations to the directed graph in relation to the package containing the potential malware. The remediation recommendation may be associated with a selectable option that, when selected, causes application 111 to perform the recommended remediation action with respect to the package (in this case, adding the recommended language to the package.json).

Exemplary Processes

FIG. 4 illustrates an exemplary process for operating the malware detection tool, in accordance with an embodiment. Process 400 may be implemented by one or more processors executing instructions (e.g., encoded in memory of a non-transitory computer-readable medium) that cause the modules of malware detection tool 130 to operate. Process 400 begins with malware detection tool 130 receiving 402 a request to scan a package integration for a malicious dependency (e.g., using scan request module 331), the package integration comprising a plurality of dependencies, the package integration to be integrated into an application. Malware detection tool 130 determines 404 a subset of the plurality of dependencies that, if executed, would be used by the application (e.g., using dependency filtering module 332). Malware detection tool 130 determines 406, by accessing a known package cache (e.g., known package cache 350), that at least a portion of a file of the subset was not previously scanned (e.g., using known dependency comparison module 333). Responsive to determining that a portion of the file of the subset was not previously scanned, malware detection tool 130 performs 408 an accessing of a graph representation of the portion, the graph representation comprising a tree with edges that connect a representation of the portion with representations of one or more further dependent files that depend from the portion, scans the portion and each of the one or more further dependent files for malware, and updates the known package cache with the tree and with results of the scan (e.g., using known package cache update module 334). Malware detection tool 130 determines 410 whether malware is within the package integration using the known package cache and the results of the scan (e.g., using malware determination module 335). Responsive to determining that malware is within the package integration, malware detection tool 130 outputs 412 an alert (e.g., to client device 110 using application 111).

Figure 5:
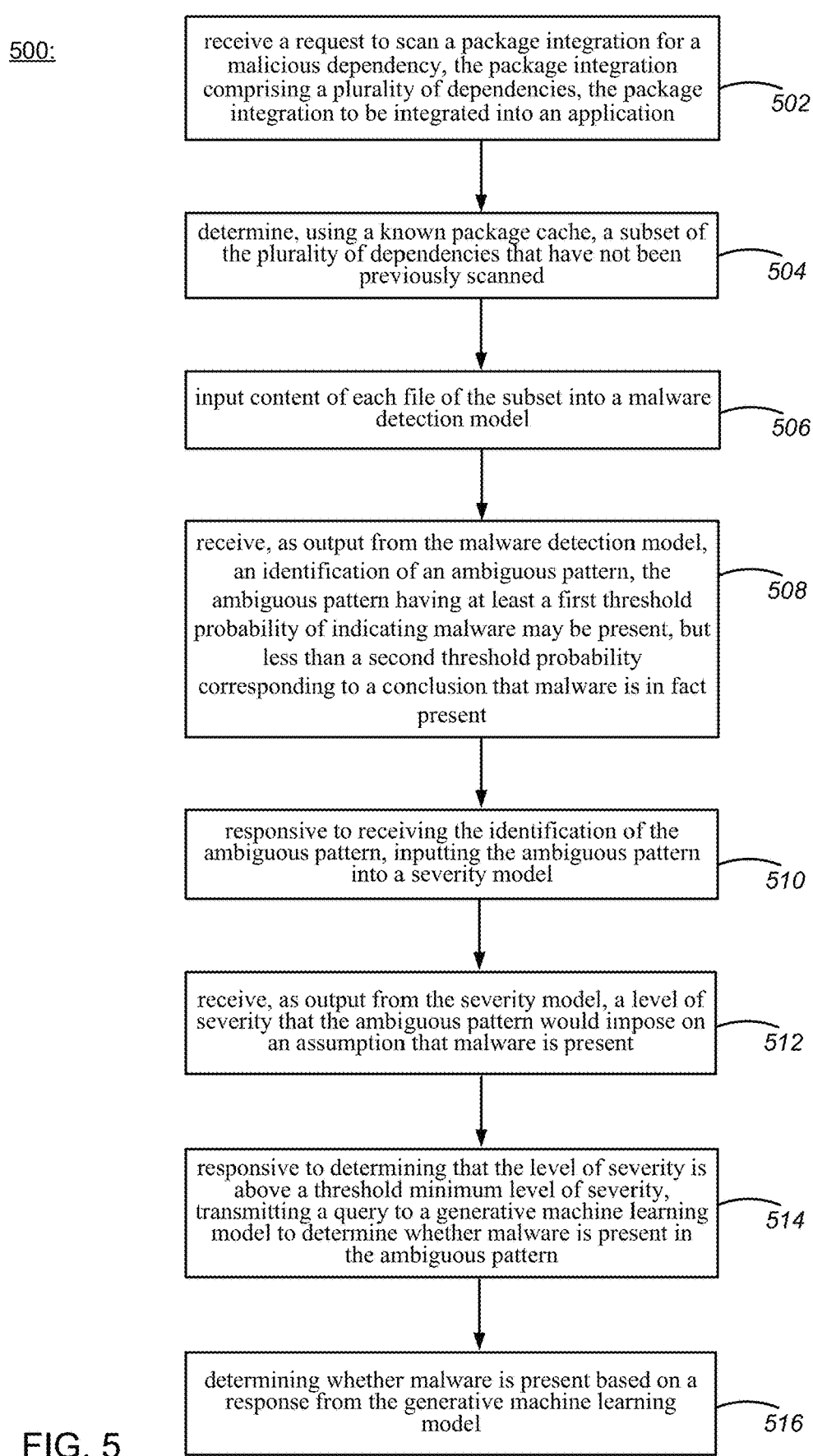
FIG. 5 illustrates an exemplary process for querying a generative machine learning model, in accordance with an embodiment.

FIG. 5 illustrates an exemplary process for querying a generative machine learning model, in accordance with an embodiment. Process 500 may be implemented by one or more processors executing instructions (e.g., encoded in memory of a non-transitory computer-readable medium) that cause the modules of malware detection tool 130 to operate. Process 500 begins with malware detection tool 130 receiving 502 a request to scan a package integration for a malicious dependency (e.g., using scan request module 331), the package integration comprising a plurality of dependencies, the package integration to be integrated into an application. Malware detection tool 130 determines 504, using a known package cache (e.g., known package cache 350), a subset of the plurality of dependencies that have not been previously scanned (e.g., using dependency filtering module 332).

Malware detection tool 130 operates malware determination module 335, going on to input 506 content of each file of the subset into a malware detection model, and receives 508, as output from the malware detection model, an identification of an ambiguous pattern, the ambiguous pattern having at least a first threshold probability of indicating malware may be present, but less than a second threshold probability corresponding to a conclusion that malware is in fact present. Responsive to receiving the identification of the ambiguous pattern, malware detection tool 130 inputs 510 the ambiguous pattern into a severity model, and receives 512, as output from the severity model, a level of severity that the ambiguous pattern would impose on an assumption that malware is present. Responsive to determining that the level of severity is above a threshold minimum level of severity, malware detection tool 130 transmits 514 a query to a generative machine learning model (e.g., generative machine learning model 351) to determine whether malware is present in the ambiguous pattern, and determines 516 whether malware is present based on a response from the generative machine learning model.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method performed by one or more computing device, the method comprising:
    receiving a request to scan a package integration for a malicious dependency, the package integration comprising a plurality of dependencies, the package integration to be integrated into an application;
    determining, using a known package cache, a subset of the plurality of dependencies that have not been previously scanned;
    inputting content of each file of the subset into a malware detection model;
    receiving, as output from the malware detection model, an identification of an ambiguous pattern, the ambiguous pattern having at least a first threshold probability of indicating malware may be present, but less than a second threshold probability corresponding to a conclusion that malware is in fact present;
    responsive to receiving the identification of the ambiguous pattern, inputting the ambiguous pattern into a severity model;
    receiving, as output from the severity model, a level of severity that the ambiguous pattern would impose on an assumption that malware is present; responsive to determining that the level of severity is above a threshold minimum level of severity, transmitting a query to a generative machine learning model to determine whether malware is present in the ambiguous pattern; and
    determining whether malware is present based on a response from the generative machine learning model.

2. The method of claim 1, wherein further responsive to receiving the identification of the ambiguous pattern and prior inputting the ambiguous pattern into a severity model, the method further comprises:
    querying a known ambiguous pattern graph with the ambiguous pattern, the known ambiguous pattern graph comprising entries mapping ambiguous patterns to whether or not they are indicative of malware;
    receiving a response indicating that the known ambiguous pattern graph does not have an entry for the ambiguous pattern; and
    responsive to receiving the response, performing the inputting of the ambiguous pattern into the severity model.

3. The method of claim 2, wherein the generative machine learning model is not queried when the known ambiguous pattern graph does have an entry for the ambiguous pattern.

4. The method of claim 1, further comprising generating an entry for a database that maps the ambiguous pattern to the determination of whether malware is present.

5. The method of claim 4, wherein the database has a graph structure, the graph structure comprising a root corresponding to the package integration and a tree showing edges between the root and the plurality of dependencies.

6. The method of claim 5, wherein the entry is stored in association with a node within the tree corresponding to one or more files of the subset corresponding to the ambiguous pattern.

7. The method of claim 1, wherein the severity model is a supervised machine learning model that is trained using historical patterns as mapped to a level of severity.

8. A non-transitory computer-readable medium comprising memory with instructions encoded thereon that, when executed by one or more processors, cause the one or more processors to perform operations comprising:

receiving a request to scan a package integration for a malicious dependency, the package integration comprising a plurality of dependencies, the package integration to be integrated into an application;

determining, using a known package cache, a subset of the plurality of dependencies that have not been previously scanned;

inputting content of each file of the subset into a malware detection model;

receiving, as output from the malware detection model, an identification of an ambiguous pattern, the ambiguous pattern having at least a first threshold probability of indicating malware may be present, but less than a second threshold probability corresponding to a conclusion that malware is in fact present;

responsive to receiving the identification of the ambiguous pattern, inputting the ambiguous pattern into a severity model;

receiving, as output from the severity model, a level of severity that the ambiguous pattern would impose on an assumption that malware is present;

responsive to determining that the level of severity is above a threshold minimum level of severity, transmitting a query to a generative machine learning model to determine whether malware is present in the ambiguous pattern; and determining whether malware is present based on a response from the generative machine learning model.

9. The non-transitory computer-readable medium of claim 8, wherein further responsive to receiving the identification of the ambiguous pattern and prior inputting the ambiguous pattern into a severity model, the operations further comprise:

querying a known ambiguous pattern graph with the ambiguous pattern, the known ambiguous pattern graph comprising entries mapping ambiguous patterns to whether or not they are indicative of malware;

receiving a response indicating that the known ambiguous pattern graph does not have an entry for the ambiguous pattern; and responsive to receiving the response, performing the inputting of the ambiguous pattern into the severity model.

10. The non-transitory computer-readable medium of claim 9, wherein the generative machine learning model is not queried when the known ambiguous pattern graph does have an entry for the ambiguous pattern.

11. The non-transitory computer-readable medium of claim 8, further comprising generating an entry for a database that maps the ambiguous pattern to the determination of whether malware is present.

12. The non-transitory computer-readable medium of claim 11, wherein the database has a graph structure, the graph structure comprising a root corresponding to the package integration and a tree showing edges between the root and the plurality of dependencies.

13. The non-transitory computer-readable medium of claim 12, wherein the entry is stored in association with a node within the tree corresponding to one or more files of the subset corresponding to the ambiguous pattern.

14. The non-transitory computer-readable medium of claim 8, wherein the severity model is a supervised machine learning model that is trained using historical patterns as mapped to a level of severity.

15. A system comprising:
memory with instructions encoded thereon; and
one or more processors that, when executing the instructions, are caused to perform operations comprising:

receiving a request to scan a package integration for a malicious dependency, the package integration comprising a plurality of dependencies, the package integration to be integrated into an application;

determining, using a known package cache, a subset of the plurality of dependencies that have not been previously scanned;

inputting content of each file of the subset into a malware detection model;

receiving, as output from the malware detection model, an identification of an ambiguous pattern, the ambiguous pattern having at least a first threshold probability of indicating malware may be present, but less than a second threshold probability corresponding to a conclusion that malware is in fact present;

responsive to receiving the identification of the ambiguous pattern, inputting the ambiguous pattern into a severity model;

receiving, as output from the severity model, a level of severity that the ambiguous pattern would impose on an assumption that malware is present;

responsive to determining that the level of severity is above a threshold minimum level of severity, transmitting a query to a generative machine learning model to determine whether malware is present in the ambiguous pattern; and determining whether malware is present based on a response from the generative machine learning model.

16. The system of claim 15, wherein the operations further comprise, further responsive to receiving the identification of the ambiguous pattern and prior inputting the ambiguous pattern into a severity model:

querying a known ambiguous pattern graph with the ambiguous pattern, the known ambiguous pattern graph comprising entries mapping ambiguous patterns to whether or not they are indicative of malware;

receiving a response indicating that the known ambiguous pattern graph does not have an entry for the ambiguous pattern; and responsive to receiving the response, performing the inputting of the ambiguous pattern into the severity model.

17. The system of claim 16, wherein the generative machine learning model is not queried when the known ambiguous pattern graph does have an entry for the ambiguous pattern.

18. The system of claim 15, further comprising generating an entry for a database that maps the ambiguous pattern to the determination of whether malware is present.

19. The system of claim 18, wherein the database has a graph structure, the graph structure comprising a root corresponding to the package integration and a tree showing edges between the root and the plurality of dependencies.

20. The system of claim 19, wherein the entry is stored in association with a node within the tree corresponding to one or more files of the subset corresponding to the ambiguous pattern.

* * * * *